United States Patent
Schmidt

(10) Patent No.: US 9,811,155 B2
(45) Date of Patent: Nov. 7, 2017

(54) METHOD AND SYSTEM FOR OPERATING A DISPLAY APPARATUS

(71) Applicant: SENSOMOTORIC INSTRUMENTS GESELLSCHAFT FUR INNOVATIVE SENSORIK MBH, Teltow (DE)

(72) Inventor: Eberhard Schmidt, Kleinmachnow (DE)

(73) Assignee: SENSOMOTORIC INSTRUMENTS GESELLSCHAFT FUR INNOVATI VE SENSORIK MBH, Teltow (DE)

(*) Notice: Subject to any disclaimer, the term of this patent is extended or adjusted under 35 U.S.C. 154(b) by 0 days.

(21) Appl. No.: 15/129,010

(22) PCT Filed: Mar. 27, 2015

(86) PCT No.: PCT/EP2015/056786
§ 371 (c)(1),
(2) Date: Sep. 26, 2016

(87) PCT Pub. No.: WO2015/144908
PCT Pub. Date: Oct. 1, 2015

(65) Prior Publication Data
US 2017/0108920 A1   Apr. 20, 2017

(30) Foreign Application Priority Data
Mar. 27, 2014   (EP) .................................... 14162073

(51) Int. Cl.
G09G 5/00 (2006.01)
G06F 3/01 (2006.01)
G09G 5/391 (2006.01)
G06F 17/24 (2006.01)
G06F 17/21 (2006.01)
G06T 7/00 (2017.01)

(52) U.S. Cl.
CPC .............. G06F 3/012 (2013.01); G06F 3/013 (2013.01); G06F 17/212 (2013.01);
(Continued)

(58) Field of Classification Search
CPC ...... G06F 3/012; G06F 17/246; G06F 17/212; G06F 3/013; G09G 5/391;
(Continued)

(56) References Cited

U.S. PATENT DOCUMENTS

2011/0134124 A1   6/2011 Contractor et al.
2011/0254865 A1   10/2011 Yee et al.
(Continued)

FOREIGN PATENT DOCUMENTS

EP   1997667 A1   12/2008
EP   2065795 A1   6/2009
(Continued)

OTHER PUBLICATIONS

International Search Report of PCT/EP2015/056786 dated Jun. 3, 2015.

*Primary Examiner* — Adam R Giesy
(74) *Attorney, Agent, or Firm* — Ronald Fernando

(57) ABSTRACT

The invention relates to a method for operating a display apparatus (12), comprising the following steps: capture of image data from at least one part of the head of a user (14) (step 110), ascertainment of at least one parameter, which the user (14) can alter by moving at least one part of the head, from the image data captured in step a) (step 120), control of a visual representation on a display apparatus (12) on the basis of the ascertained at least one parameter (step 130), wherein the capture in step a) is taken as a basis for ascertaining at least one quality parameter (step 140) and the at least one quality parameter is taken as a basis for varying at least one resolution of at least one part of the visual representation (step 150). Moreover, the invention relates to a corresponding computer program product and to a corresponding system for operating a display apparatus.

22 Claims, 6 Drawing Sheets

Figure 1:
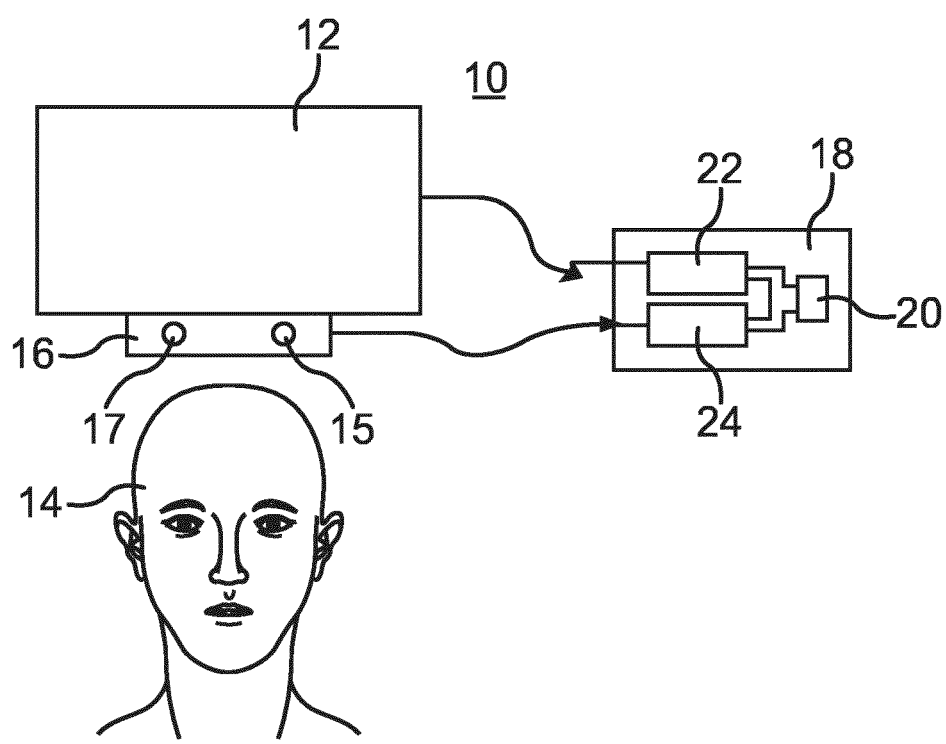

(52) U.S. Cl.
CPC .......... *G06F 17/246* (2013.01); *G06T 7/0002* (2013.01); *G09G 5/391* (2013.01); *G06T 2207/30168* (2013.01); *G09G 2340/045* (2013.01); *G09G 2340/0407* (2013.01); *G09G 2354/00* (2013.01)

(58) Field of Classification Search
CPC ......... G09G 2340/045; G09G 2354/00; G09G 2340/0407; G06T 7/0002; G06T 2207/30168
See application file for complete search history.

(56) References Cited

U.S. PATENT DOCUMENTS

| | | | |
|---|---|---|---|
| 2012/0256967 A1 | 10/2012 | Baldwin et al. | |
| 2012/0272179 A1 | 10/2012 | Stafford | |
| 2013/0257723 A1 | 10/2013 | Sawada | |
| 2015/0301600 A1* | 10/2015 | Lankford | G06F 3/013 348/78 |

FOREIGN PATENT DOCUMENTS

| | | | |
|---|---|---|---|
| GB | 2467898 A | 8/2010 | |
| GB | 2490868 A | 11/2012 | |
| WO | 00/33731 A1 | 6/2000 | |
| WO | 2010/118292 A1 | 10/2010 | |
| WO | 2013/093040 A1 | 6/2013 | |

* cited by examiner

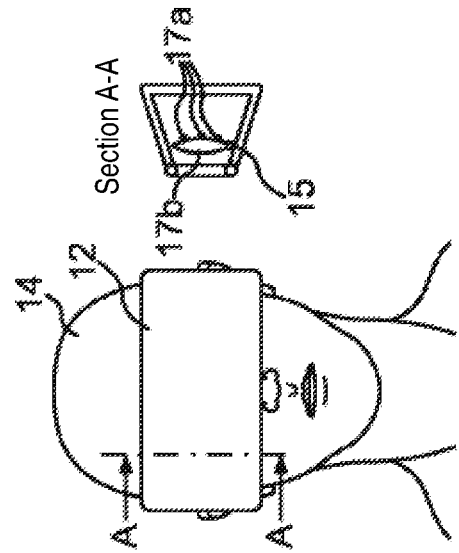
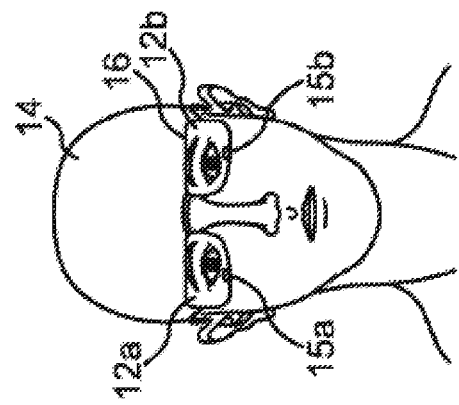
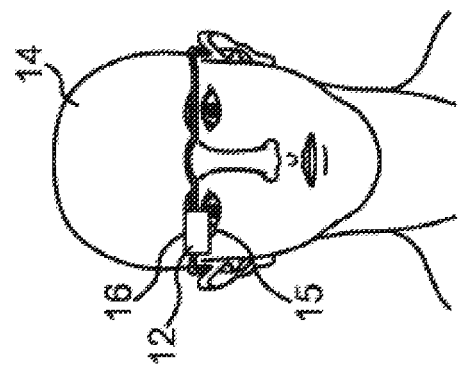
Fig. 2c
Fig. 2b
Fig. 2a

METHOD AND SYSTEM FOR OPERATING A DISPLAY APPARATUS

CROSS REFERENCE TO RELATED APPLICATIONS

This application is a National Stage of International Application No. PCT/EP2015/056786 filed Mar. 27, 2015, claiming priority based on European Patent Application No. 14 162 073.2, filed Mar. 27, 2014, the contents of which are incorporated herein by reference in their entirety.

The present invention relates to a method for operating a display apparatus, which includes the following steps: first, image data of at least one part of the head of a user is captured. Subsequently, at least one parameter alterable by the user by movement of at least one part of the head is ascertained from the captured image data, and subsequently a visual representation on a display apparatus is controlled depending on the ascertained at least one parameter. Furthermore, the invention relates to a computer program product with a program for a computing device with program code sections for executing and/or causing the steps of the method when the program is executed on the computer device. Finally, the present invention includes a corresponding system for operating a display apparatus with a capturing device for capturing image data of at least one part of the head of a user, at least one computing device, which is adapted to ascertain at least one parameter alterable by the user by movement of at least one part of the head from the image data captured by the capturing device, as well as a control device for controlling a visual representation on a display apparatus depending on the at least one parameter ascertained by the computing device.

In this context, so-called tracking devices, for example eye, face or head trackers, are known, which are adapted to provide images of at least one part of the head of a user and to ascertain the viewing direction, eye movements and other eye and head data of the user therefrom. Such tracking devices can occur as a physical unit or be distributed. They are distributed if for example cameras and lightings are separately provided or integrated in a monitor, while the program for data processing runs on a computer, for example PC, tablet PC or smart phone etc., connected thereto. However, such tracking devices can also be formed as a physical unit if the computer unit is integrated in a device, for example in the manner of glasses to be worn by the user, a tablet PC or a laptop, wherein this device further has at least one camera, at least one display and optionally at least one lighting device. However, optionally, it can also be provided in this case that the data captured by the computer unit via the at least one camera and optionally further processed is passed to a further computer, for example a PC, tablet PC or to a smart phone etc., for utilization.

At least one parameter alterable by the user by movement of a part of the head is ascertained from the image data determined by the tracking device. This parameter can for example be the viewing direction, but also eye movements, head movements and other eye and head data. This at least one parameter is then used to control a visual representation of a software application on a display apparatus, for example to scroll a representation, to select a cell in an Excel table for processing, to select an icon etc. In this manner, disabled persons, to which conventional operation of computer programs is not possible, can for example also use software applications.

Within the scope of the following explanations, the expression "application" denotes an application program, for example Word. By the expression "file", a document is denoted, like the present one. Context parameters can be bound to a file or an application or finer units such as objects, settings and the like.

It has appeared that users find the operation of software applications by controlling by means of a tracking device in different situations more difficult or easier, wherein the operability can also be dependent on the requirements of the software application, in particular of the respectively sought interaction.

Therefore, the object of the present invention is in providing an initially mentioned method, a corresponding computer program product as well as a corresponding system, by means of which operation of a software application visually represented on a display apparatus is allowed as simply and reliably as possible even in very different situations.

This object is solved by a method having the features of claim 1, a computer program product having the features of claim 13 as well as by a system having the features of claim 14.

The present invention is based on the combination of multiple realizations: on the one hand, the robustness of the control of visual representations of software applications on a display apparatus by means of tracking devices is greatly influenced by the environmental conditions, physiognomic and cosmetic eye and/or head parameters of the user. On the other hand, the robustness of the control is influenced by the behavior of the user. Furthermore, the robustness and also its influence by the mentioned parameters are different according to the specific characteristics of the used technical components like camera sensors, optics, optionally present lighting and the like. Namely, different tracking devices and even different apparatuses of the same design do not provide the same measurement accuracy and robustness for all of the users, applications and situations. Moreover, the effects of the mentioned differences in robustness are different according to requirement of the software application to be controlled. The smaller the elements relevant to control are represented on the screen, the greater are the effects of the robustness variations on the operability and the user perception. Finally, it is to be taken into account that the more users use such control technologies and the more ordinary, i.e. uncontrolled, the fields of employment and the software applications become, a uniform quality of the operability as well as the user perception becomes all the more important.

In order to allow effective utilization of such interaction devices, i.e. tracking devices, by which software applications can be operated, to very different users, in the present invention, at least one quality parameter reflecting the accuracy is ascertained and an "adaptive zoom" is provided for the interaction.

If a user for example selects a cell in a spreadsheet program by the viewing direction within the scope of the present invention, according to the invention, the cell grid can be provided to the user with a zoom level for this purpose, which is matched to the quality of capture of the image data or to the accuracy of the above mentioned ascertained one parameter with the specially used tracking device or in the certain situation, which is influenced by environmental conditions, or to the certain user. Conversely, there is the possibility in a selecting device provided by the application, for example a cell marking in a spreadsheet program, in which a cell is normally large, of making large as many cells as it results from the currently achievable accuracy. This is dependent on physical characteristics of the user, the environmental conditions, the used hardware, the distance between user and tracking device and other conditions. Accordingly, if the accuracy of only four cells is large, then a block of four cells as the selection element is always displayed in highlighted manner. Furthermore, also in non-discrete interaction scenarios, the cursor or mouse pointer can be adapted to the current quality of capture of the image data and/or the accuracy of the above mentioned ascertained parameter, and become as much larger with poorer quality or lower accuracy as the control of the software application is always effected corresponding to the visual expectations.

The differences in the representation do not have to be large, but can also be very small. It is crucial that the adaptation is effected such that the user can also perform the interaction, which he expects due to the visual representation of operating elements of the software application.

Therefore, according to the invention, at least one quality parameter is ascertained based on the capture of the image data and subsequently at least the resolution of at least one part of the visual representation is varied depending on the at least one quality parameter.

By the term of resolution, within the scope of the invention, the size of the visual representation is meant. An alteration of the resolution in terms of an alteration of the number of pixels per object with unchanged size can, but does not have to be performed therein.

Accordingly, if poor quality is ascertained based on the captured image data, for example from the captured image data itself or from intermediate or result data, which is calculated from this image data, thus, the resolution of at least one part of the visual representation can be altered to further allow the operation of the software application by means of the tracking device by the user even under these poor conditions. In this manner, optimum resolution, for example the zoom level of the visual representation represented on the display apparatus, can be provided to allow optimum "virtual accuracy" for the interaction of the user with the software application.

By the method according to the invention, high robustness of such applications can accordingly be provided for very different users, hardware equipments and environmental conditions. In particular, reliable operation of such an application is also allowed with inexpensive hardware equipment, with high accuracy requirements of the software application to be controlled or a user with restricted capabilities of operation.

Therein, the quality parameter relates to the quality, in particular measurement accuracy of the parameter ascertained from the image data or of the image data itself. It represents a measure of the accuracy, in particular measurement accuracy, of the ascertained parameter, and in particular also of the ascertainment of the parameter and thereby is a parameter different from the ascertained parameter. Therein, the quality parameter and the ascertained parameter are ascertained based on the same image data. Therein, the quality parameter can in particular be determined based on this image data and/or based on the ascertained parameter. For ascertaining the quality parameter, data incorporated in the ascertainment of the parameter and/or the ascertained parameter itself is preferably analyzed, wherein the data can in particular represent the captured image data and/or intermediate and/or result data, which is calculated from the image data. Thus, the ascertained parameter can be construed as representing a measured quantity, wherein the quality parameter indicates the measurement accuracy or reliability associated with the measured quantity or a measure of the accuracy, in particular measurement accuracy, associated with the measured quantity. The quality parameter quantifies, in particular also in predicting manner, thus, e.g. how large a deviation of the ascertained parameter from an actual parameter, e.g. maximally, at least or on average, is, for example a maximally possible deviation between the ascertained viewing direction from an actual viewing direction. The quality parameter can also indicate an estimated value, by which the ascertained parameter, e.g. maximally, deviates from the corresponding actual parameter. The quality parameter can for example also indicate the actual or estimated deviation of parameters consecutively ascertained immediately in time or in a certain temporal distance, e.g. in the form of a dispersion of the consecutively ascertained parameters around an average value. Hereto, for determining the deviation, the sum of absolute difference values between ascertained parameters or the sum of absolute difference values between ascertained parameters and the average of the ascertained parameters or other methods such as standard deviation, variance, correlation, measure of spectral constancy (spectral flatness) can also be used among other things. The quality parameter as the temporal deviation of ascertained parameters can for example be determined for a fixed or fixed and overlapping period of time or a period of time determined from a viewing event (fixation, saccade etc.).

Thus, the ascertained parameter has a measurement inaccuracy, which the associated quality parameter indicates or reflects. It can e.g. be provided that the quality parameter itself therein does not indicate the environmental conditions or environmental influences, which have influence on the measurement accuracy, but represents the measurement accuracy or a measure of the measurement accuracy itself. Thereby, the quality parameter itself e.g. does not indicate position information about the user, and e.g. such one either cannot be derived from the quality parameter. Therefore, the environmental conditions, e.g. environmental brightness, distance of the user to the capturing device etc., advantageously do not have to be necessarily known in the capture of the image data itself, however, while their effects on the ascertainment of the parameter can be ascertained and indicated, e.g. if the quality parameter observes image parameters such as contrast and noise portions and therefrom an influence on the accuracy or stability of the ascertained parameter is determined. Upon need, however, conclusions about environmental conditions, such as environmental brightness, can also be drawn from the image parameters.

Preferably, for ascertaining the at least one quality parameter, at least one quality and/or magnitude of the parameter ascertained from the image data and/or a quality of the capture of the image data and/or the captured image data can be analyzed. Hereby, the measurement accuracy of the ascertained parameter can be advantageously ascertained without having to know or directly measure the current environmental conditions. In particular, the magnitude of an intermediate parameter required for ascertaining the parameter and ascertained from the image data can also be evaluated and/or the quality of the image data in the above mentioned analysis.

If the resolution relates to a characteristic, in particular the size, of the visual representation, thus, the resolution is preferably varied such that with lower quality of the ascertained parameter indicated by the quality parameter the resolution is increased, e.g. the representation is enlarged, with respect to a resolution with higher accuracy indicated by the quality parameter. If the resolution relates to the resolution of a movement speed of a movable element, which is encompassed by the visual representation, the resolution is e.g. varied such that the resolution is reduced with lower accuracy, e.g. the movement speed is reduced, with respect to the resolution with higher accuracy of the ascertained parameter. This facilitates the control of the representation for the user in both cases.

Preferably, the visual representation includes at least one element movable by movement of at least one part of the head, wherein in step e) the resolution of a movement speed of the at least one movable element is varied depending on the at least one quality parameter.

Under poor conditions, it can be impossible for the user with a given resolution to accurately reach an element on the visual representation by movement of at least one part of the head. If the resolution of the movement speed of the movable element is then reduced, the operation of the application is facilitated in this manner.

In a preferred embodiment, in step e) the resolution of the entire visual representation is varied depending on the at least one quality parameter. In this manner, the operation of the software application for example of users with restricted visual capabilities, for example as a result of eye diseases, age and the like, is facilitated.

Alternatively, in step e) the resolution of only a part of the visual representation can be varied depending on the at least one quality parameter. Thereby, the content capable of being represented on the display apparatus is only insignificantly reduced such that it can for example be worked with multiple windows despite of increase of the resolution if for example only the content of the respectively active window is represented with improved resolution.

The visual representation can include at least one static and/or dynamic element, wherein the resolution of the static and/or the dynamic element is varied depending on the at least one quality parameter in step e). As a part of the visual representation, the resolution of which is varied, at least one of the elements from the following group can come into consideration: an area according to a magnifier function, the content of a presettable working window, a mouse pointer, a cursor and/or logical segments of an application, which the visual representation generates. For example, this could relate to the cell area of a worksheet, the contents of a cell, the icon bars, the pull-down menus thereof, scroll bars etc. in Excel or another software application.

In this manner, a selection device, thus a mouse pointer or a cursor, can for example be varied, i.e. enlarged under poor conditions, such that it reproduces the level of accuracy, by which the user can select visually represented target objects of the application represented on the display apparatus in the current situation.

Preferably, for ascertaining the at least one quality parameter, at least one quantity of the following group is ascertained: parameters of the image data captured in step a), in particular noise portions, frequency and/or intensity distributions in the image and/or of the at least one ascertained object, on the one hand and/or parameters in the evaluation of the image data captured in step a), in particular in intermediate or result data calculated from the captured image data on the other hand.

In other words, the quality parameters can be ascertained at each location of the signal processing chain, from the camera image up to the finally calculated data. In the noise portions, the signal to noise ratio or other parameters of the ascertained objects, in particular such ones from pupil, limbus or corneal reflex, come into consideration. In noise portions of the result data, in particular the viewing direction or the head orientation for example comes into consideration.

For ascertaining the at least one quality parameter, the image data captured in step a) is preferably analyzed with regard to at least one of the following quantities: frequency portions in presettable frequency ranges, in particular by spatio-temporal frequency analysis and wavelets, contrast values in presettable image areas, in particular gradients, edges, intensities, rates/distributions in image areas, magnitude values of presettable parameters, magnitude values of result data, the presence of at least one presettable object and/or a rate of change or acceleration of intermediate or result data ascertained from the image data captured in step a). Furthermore, in particular corresponding machine/adaptive learning methods come into consideration for the analysis. By evaluation of the frequency portions in presettable frequency ranges, noise portions or jitter can be evaluated as abnormalities. In the evaluation of the contrast values, certain image areas in particular around certain measurement objects, for example the pupil etc., can come into consideration for evaluation. In the magnitude values of presettable parameters, in particular magnitude values of the measurement objects come into consideration. If a small corneal reflex is for example ascertained, rather a low measurement quality is to be assumed. In the magnitude values of result data, for example the viewing angle comes into consideration: thus, a small viewing angle is rather an indication of high measurement quality, while a large viewing angle rather represents an indication of a low measurement quality. If the presence of presettable objects is checked, for example, it is to be taken into account if the presence of one or two eyes is ascertained. For example, if all of the searched corneal reflexes for both eyes are found, thus, this is an indication of a higher measurement quality than if corneal reflexes in one or both eyes are not found. Further, if the viewing angles of two eyes for example differ by more than a presettable threshold value, thus, this can be an indication of a low measurement quality. A high rate of change or acceleration for example of the head position data rather speaks for a low measurement quality, while low rates of change and acceleration conversely speak for a high measurement quality.

The resolution can be varied according to a linear, a non-linear, a continuous and/or a discontinuous characteristic line. In this manner, adaptation to the performance of the corresponding computing unit can for example be performed or the specific requirements of a certain application can be accommodated. For example, implicit application cases or also application cases sometimes referred to as passive, in which the point of view to the representation is for example used, but not shown, as it is for example the case in some games, function better with a continuous characteristic line. Explicit application cases, thus such ones, in which the point of view is made visible and a user visibly moves for example a cursor or another selection mark, such as for example a spreadsheet program or input masks, function better with discrete magnifications. The same functions for the interaction by head movement with an application. A non-linear characteristic line is in particular reasonable in such application cases, in which the size differences of the interaction elements of the representation are significant and a more severe magnification has to be fast selected with lower measurement quality to ensure a smooth interaction.

It can be provided that the variation of the resolution can be turned on and off by a user, in particular by a key command, a voice command or a gesture command. For example, if the resolution of the entire visual representation is increased, this can result in the fact that the work with a spreadsheet program running in a working window is facilitated. However, after or during processing, other working windows can be poorly recognizable. By the possibility of turning on and off the variation of the resolution, all of the working windows on the display apparatus can again be recognizable in simple manner for example to allow a change of the software application to a user. In addition, it can be reasonable to store and again retrieve one or more resolutions globally suitable for the user or specifically suitable for certain application cases. It can be particularly useful to bind such specific resolutions to the application case and to automatically adjust it in case of its occurrence such that a habituation effect can occur at the user and the resolution is not varied more than necessary.

Preferably, the at least one quality parameter is ascertained after step a), in particular with step b) or between step b) and step c) or alternatively in continuous manner, i.e. first after step a) and further in presettable temporal distances and/or depending on at least one presettable event, preferably upon exceeding and/or falling below at least one presettable threshold value for image, intermediate or result data, in particular of at least one quality parameter derived from this data. As particularly preferred points of time for ascertaining the at least one quality parameter, there is to be mentioned the point of time of initialization of the system, including the calibration and the validation, or the change of applications, files, views or process steps, which can entail new sizes of the operating elements.

The calculations required for variation of the resolution can be performed in the tracking device, for example in an eye tracker, or by a separate program on the target computer or as a part of the operating system or as a part of an application.

As the at least one part of the head of the user, his head itself and/or one and/or two eyes of the user are preferably moved.

Further preferred embodiments are apparent from the dependent claims.

The preferred embodiments presented with respect to the method according to the invention and the advantages thereof correspondingly apply, as far as applicable, to the computer program product according to the invention and to the system according to the invention for operating a display apparatus.

Figure 3:
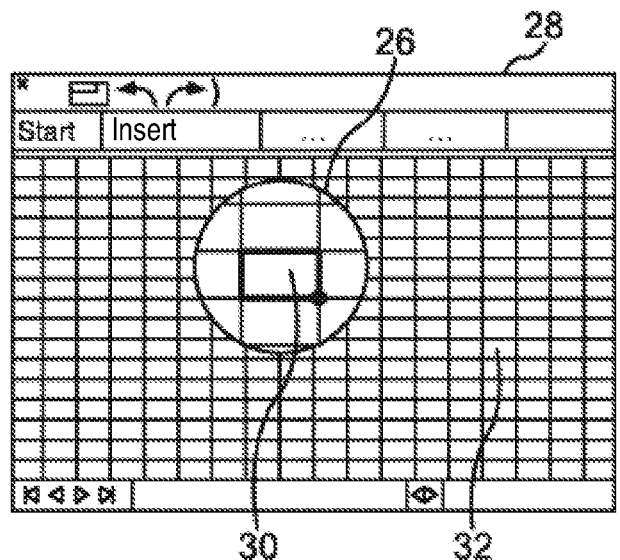
Figure 4:
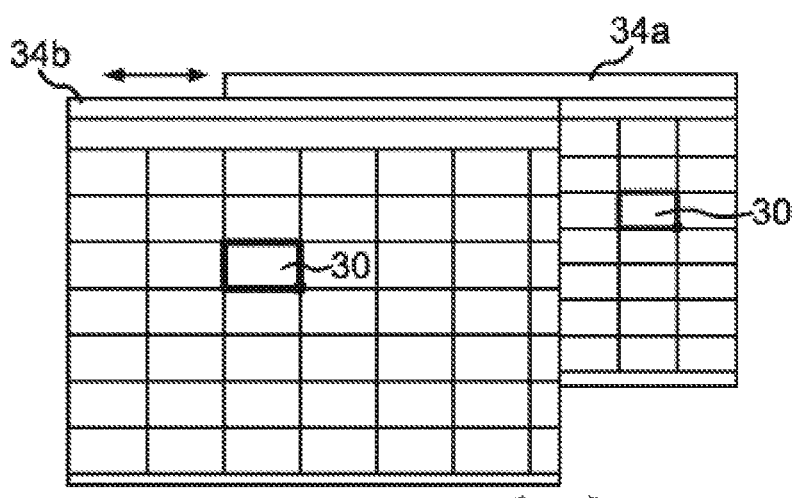
Figure 5:
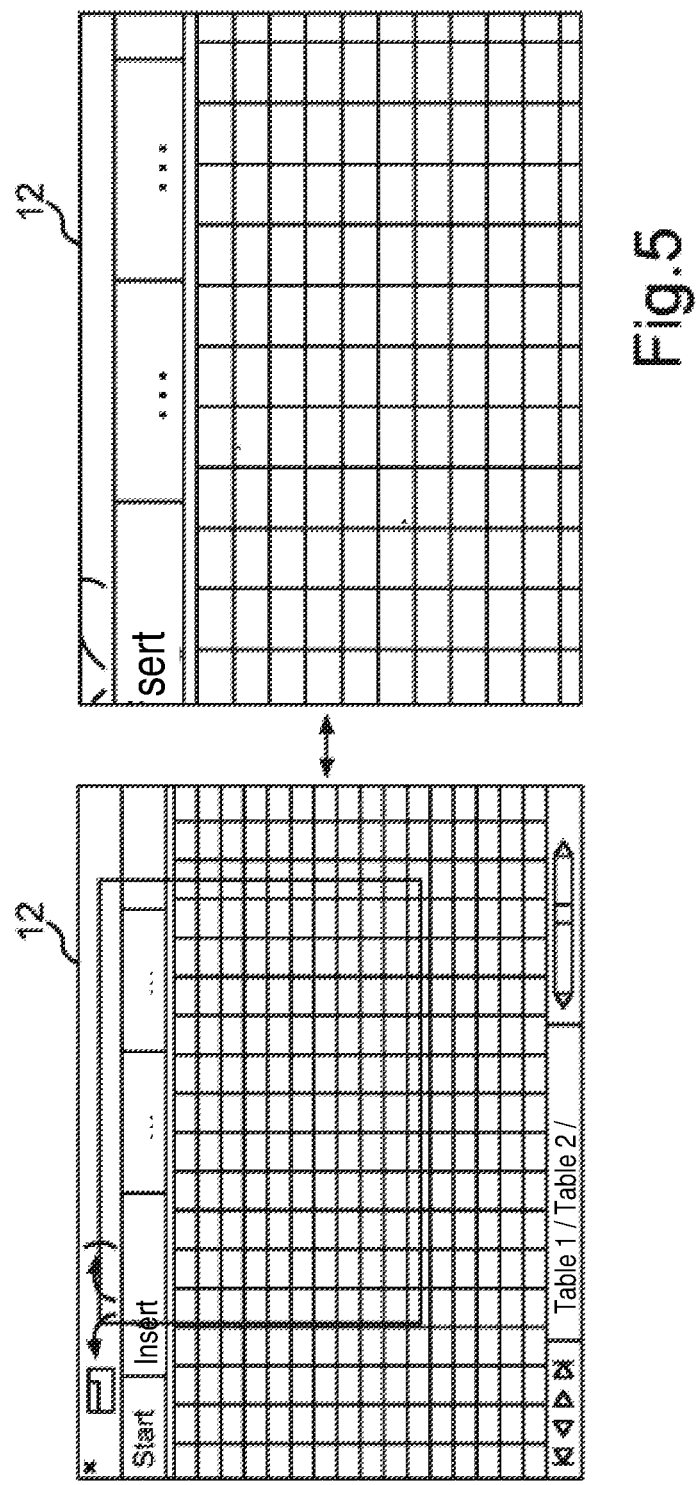
Figure 6:
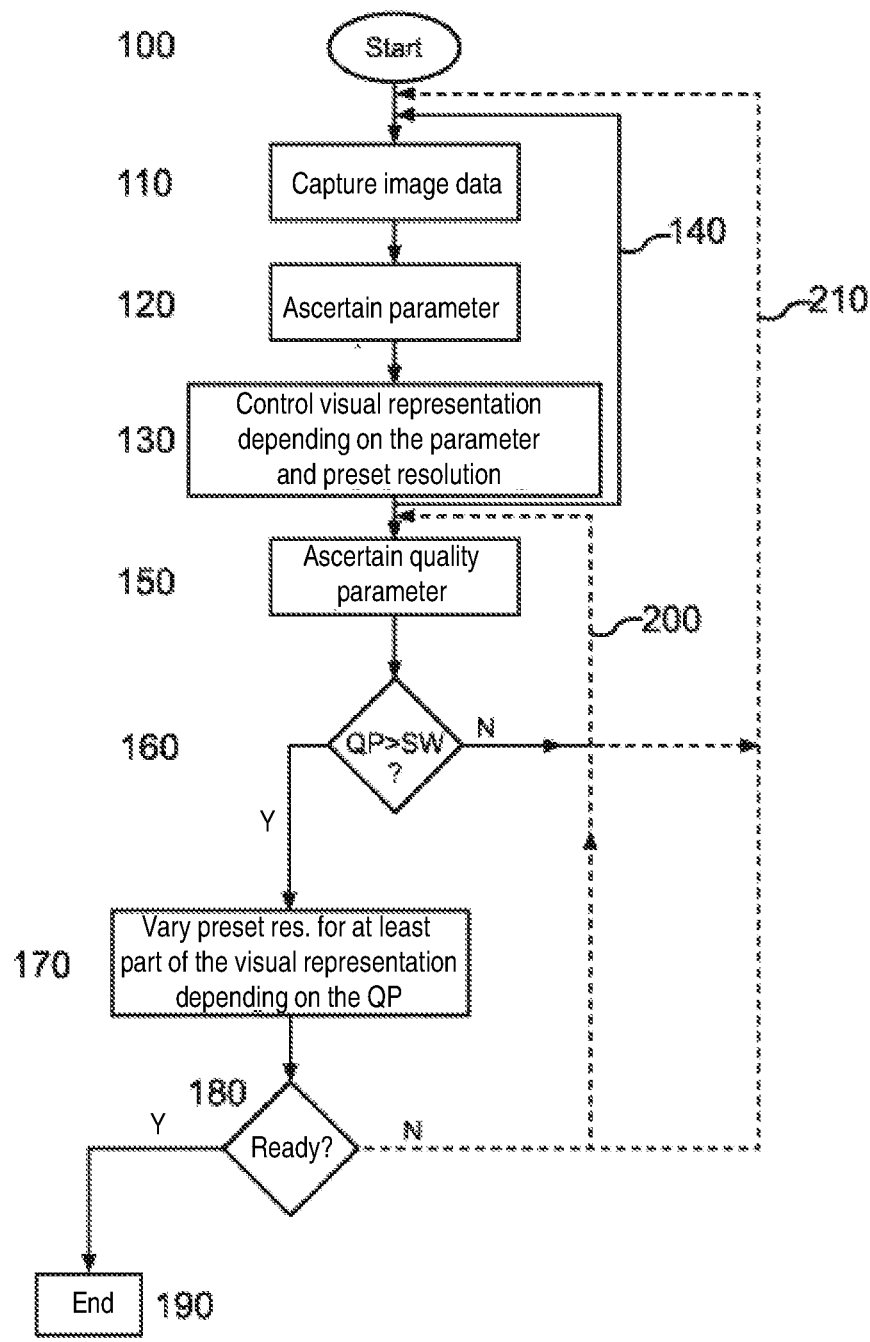
Figure 7:
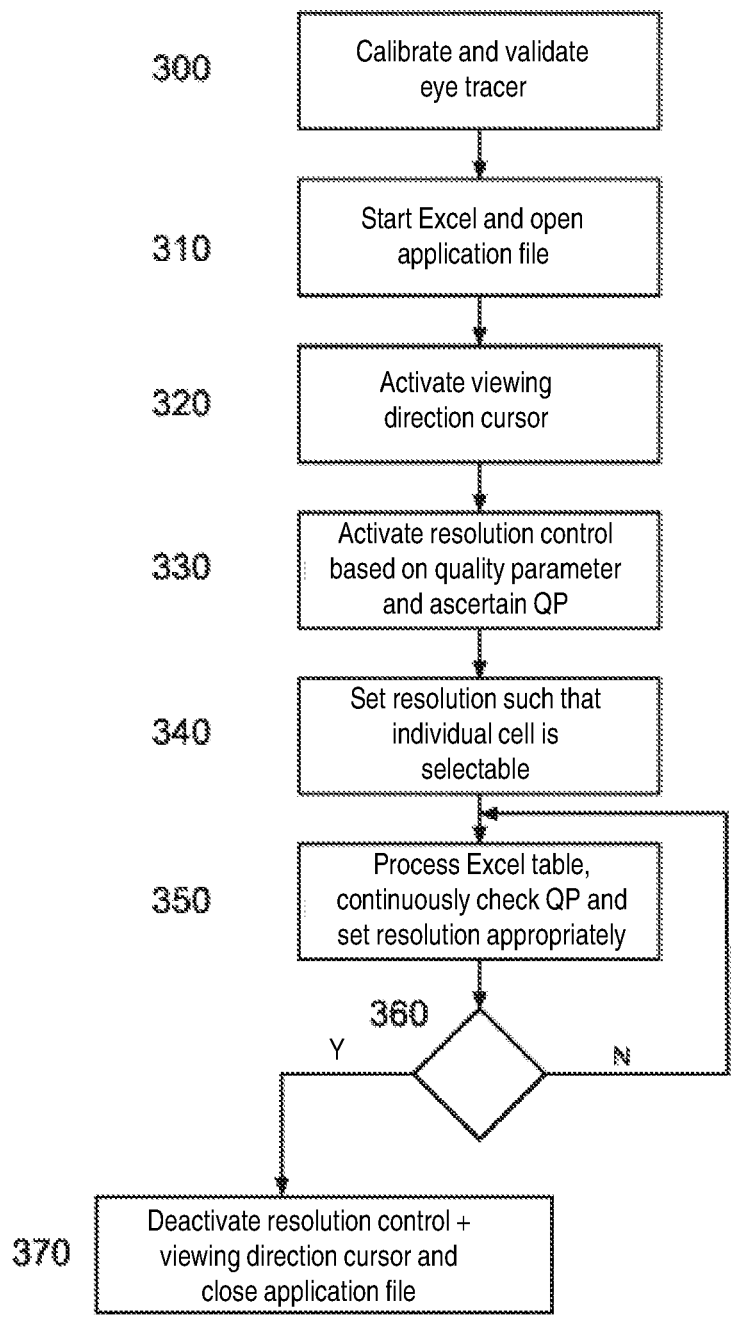

Now, embodiments of the present invention are described in more detail below with reference to the attached drawings. There show:

FIG. 1 in schematic representation the construction of a first embodiment of a system according to the invention;

FIGS. 2a, 2b and 2c in schematic representation the construction of a second, a third and a fourth embodiment of a system according to the invention;

FIG. 3 a first application example of the present invention;

FIG. 4 a second application example of the present invention;

FIG. 5 a third application example of the present invention;

FIG. 6 in schematic representation a signal flow graph of a first embodiment of the method according to the invention; and FIG. 7 in schematic representation a signal flow graph of a second embodiment of the method according to the invention.

In the different figures, the same reference characters are used below for identical and identically acting elements for the sake of clarity.

FIG. 1 shows the construction of a system 10 according to the invention in schematic representation, as it can in particular be applied in a stationary situation. Therein, a monitor 12 is positioned in front of a user 14, wherein an eye tracker 16 is disposed at the bottom of the monitor 12, which includes a lighting device 17 and a camera device 15 for capturing image data of at least one part of the head of the user 14. A data processing device 18 is coupled to the monitor 12 and the eye tracker 16, in which a software application 20 is stored, which generates a visual representation on the monitor 12. By means of a control device 22, which is coupled to a computing device 24 of the data processing device, the visual representation of the application on the monitor 12 can be controlled. The computing device 24 is formed to ascertain at least one quality parameter based on the image data captured by the eye tracker 16 of at least one part of the head of a user, in particular its head itself or one or two eyes. The control device 22 is adapted to vary the resolution of at least one part of the visual representation on the monitor 12 depending on the at least one quality parameter ascertained by the computing unit 24. In an embodiment not shown, multiple lighting devices 17 and/or multiple camera devices 15 can also be provided. Further, alternatively, the above mentioned ascertainment of the quality parameter can also occur on a computing device, which is accommodated in the eye tracker, wherein only the measurement data and the ascertained quality parameter are then passed to the data processing device 18.

For determining the at least one quality parameter, the computing unit 24 can evaluate parameters in the captured image data, in particular noise portions in the image and/or noise portions of the ascertained objects. It can also evaluate parameters in the evaluation of the captured image data, in particular in the intermediate or result data calculated from the captured image data. Thereto, the computing unit 24 can be adapted to analyze the captured image data with regard to frequency portions in presettable frequency ranges, contrast values in presettable image areas, magnitude values of presettable parameters, magnitude values of result data, the presence of presettable objects and/or a rate of change or acceleration of intermediate or result data ascertained from the captured image data.

FIGS. 2a, 2b and 2c schematically shows the components of an embodiment of a system according to the invention, as they can be preferably applied in a mobile situation. Therein, an eye tracker 16 is used, which can be worn by a user 14 in the manner of glasses and besides at least one camera 15 for capturing image data of at least one eye of the user 14, furthermore has at least one display unit 12, for example a display, which is coupled to the wearable eye tracker 16 such that an image can be projected into at least one eye of the user 14. While FIG. 2a shows a monocular embodiment, a binocular embodiment is illustrated in FIG. 2b. The monocular embodiment can be formed with only one camera 15 and one display apparatus 12, while the binocular embodiment is realized with two display apparatuses 12a, 12b and two cameras 15a, 15b.

In the embodiment illustrated in FIG. 2c, the display apparatus 12 is opaquely formed like in a closed head-mounted display (HMD) and disposed in a more or less closed mask, which moreover contains the at least one camera 15 as well as LEDs 17a and optics 17b associated with the LEDs 17a of the eye tracker 16 either in monocular or binocular form. In such an embodiment, the display apparatus 12 provides the images for both eyes of the user 14.

The data processing device 18 of FIG. 1 can be provided in the respective eye tracker 16 in the embodiments of FIGS. 2a, 2b and 2c as well as the mentioned alternative. However, it is also possible to couple the eye trackers 16 of it via cable or radio to a mobile or stationary data processing device 18. In case of a mobile design of the data processing device 18, it can preferably be formed as a smart phone or tablet PC.

FIG. 3 shows in schematic representation an example for an application of the present invention in a spreadsheet program, for example Excel. Depending on the ascertained quality parameter, the resolution is increased in an area 26 according to the magnifier function. The area 26 can be moved over the entire visual representation 28 depending on a viewing direction of the user ascertained from the captured image data. As is clearly apparent, the dimensions of a cell 30 within the area 26 are considerably larger than in a cell 32 outside of the area 26. As is further apparent, the user 14 has activated the cell 30 for processing by a presettable measure. According to the invention, the processing can be effected with a larger resolution corresponding to the state of the ascertained quality parameter and optionally to the context information than it is used for the representation outside of the area 26. It can be provided that the user can store and reuse a once determined magnification setting. Furthermore, it can be provided that the resolution can be varied upon determination of a change of the quality parameter. Thereby, an optimum representation for efficient operation is always achieved.

On the one hand, this function allows the user 14 to keep the overview, on the other hand it allows processing under good optical conditions. The measure for activating the cell 30 within the area 26 can for example be in that the user 14 directs his view to this cell, optionally presses a key, performs a gesture or delivers an acoustic signal at the same time. It can also be provided that the activation of the cell 30 is effected in that the user 14 directs his view to this cell 30 and twinkles with one or two eyes within a presettable time window or fixes the cell for a presettable minimum time. Other possibilities are conceivable to the expert, but not the subject matter of the present invention.

FIG. 4 shows a further application example of the present invention. Here, the resolution of a working field, i.e. for example a working window, is varied depending on the at least one quality parameter. If good conditions are present, i.e. for example high quality tracking device, good lighting, low distance between tracking device and user etc., the working window can be presented with lower resolution on the display apparatus 12, for example like the working window 34a. However, if the quality parameter is indicative of poor conditions, the working window is represented with improved resolution, see working window 34b.

FIG. 5 shows a further application of the present invention. The visual representation on the monitor 12 under good conditions is shown on the left, while the visual representation of the same application under poor conditions is shown on the right. As is clearly apparent, the resolution of the entire representation has been increased.

FIG. 6 shows an embodiment of a method according to the invention. The method starts in step 100. In step 110, image data of at least one part of the head of a user is captured. Subsequently, in step 120, at least one parameter alterable by the user by movement of at least one part of the head is ascertained from the image data captured in step 110. Subsequently, a visual representation on a display apparatus is controlled in step 130 depending on the ascertained at least one parameter and a preset resolution. For example, the viewing direction is ascertained in step 120 and thereby a cell 30 is activated, see for example FIGS. 3 and 4 hereto. In any case, the measurement loop then continuously further runs, as symbolized by step 140, to ascertain the parameter from the image data, at least as long as the thus configured interaction is active.

Moreover, in step 150, at least one quality parameter is presently ascertained based on the image data captured in step 110. Therein, the immediately captured image data can be evaluated or also intermediate or result data calculated therefrom. Therein, noise portions in the image and/or noise portions of the ascertained objects are in particular examined in more detail or for example noise portions of the ascertained viewing direction.

In step 160, it is examined if the value of the quality parameter is above a presettable threshold value. If this is the case, thus, in step 170, the preset resolution is then varied for at least one part of the visual representation on the display apparatus depending on this value. However, if falling below the threshold value is determined in step 160, the method is continued either in step 200 or in step 210 (according to implementation).

The steps 150 to 170 can be executed once, for example in the initialization of a system according to the invention, in particular including the calibration or the validation. In this case, optionally with bypassing the step 160, in step 180 it is branched to the branch indicated by "J", whereupon the method is terminated in step 190 (the measuring loop including the steps 110, 120, 130 and 140 continues of course).

If the evaluation is to be continuously performed, the method branches backward in step 180 according to convention via step 200 or step 210. Upon backward branching according to step 200 or step 210, the steps 150 to 180 can be continuously performed regularly (as presently illustrated) or also trigged by event or threshold value.

FIG. 7 shows an embodiment of the method according to the invention on the example of the spreadsheet program Excel and the use of an eye tracker as a tracking device. Therein, in step 300, the eye tracker is first calibrated and validated. For this purpose, the eye tracker for example measures where the user 14 looks on the monitor 12 (gaze point), and validates the accuracy depending on the monitor coordinates. In step 310, Excel is started and an application file is opened. Subsequently, in step 320, a viewing direction cursor is activated, i.e. a cursor, which can be moved over the monitor by the user by variation of his viewing direction. The activation is for example effected via a presettable key on the keyboard.

Subsequently, i.e. in step 330, or at the same time with step 320, the resolution control based on quality parameter according to the present invention is activated. If this is not effected at the same time in step 320, it can also be effected by pressing a presettable key combination or by an acoustic or visual signal in step 330.

In step 340, the resolution is set such that depending on the ascertained quality parameter in the application example a single cell of an Excel table can be selected by means of the viewing direction. The individual cell, to which the user 14 directs his view, is represented highlighted. Alternatively, the group of cells, which corresponds to the current resolution of the representation and the quality parameter of the eye tracker, could be highlighted. The user then sees that the resolution is not sufficient to visually select an individual cell. If he activates the resolution adaptation according to the invention, thus, the resolution is adapted such that he can securely visually select a cell.

In step 350, the respective cell selected by viewing direction is processed. This involves the selection of a cell by means of the viewing direction, the activation of the cell edit mode, in which it is begun to press on the keyboard or to speak. Subsequently, a formula is for example entered in a cell area as an argument to address a first cell of a cell area. Thereupon, it is looked to a relevant cell and pressed a key to select it. Subsequently, it is looked to the last cell of the relevant cell area and the keyboard is released to complete the selection. Subsequently, the ")" key is for example pressed to terminate the formula input. If the last relevant cell of the area is for example in an area within this operation, which has been validated with lower accuracy than the start cell of the relevant area, then the zoom is automatically varied to allow individual cell selection in this area. The same would happen according to the invention if for example due to a varied distance between user and eye tracker the noise portions change in the measurement of viewing direction. Alternatively, the setting of the auto-scaling according to the invention could be such that the entire visible cell area is immediately, i.e. automatically, adapted in the resolution such that the user can always securely visually select a cell under the given conditions.

During the processing of the Excel table in step 350, accordingly, the at least one quality parameter is continuously checked and the resolution is adequately set, in particular such that an individual cell of an Excel table remains selectable even with deterioration of the quality parameter.

In step 360, it is examined if the processing of the Excel table is terminated; if no, it is branched backwards to step 350; if yes, step 370 is executed, whereupon the resolution control is deactivated and/or the viewing direction cursor is deactivated and/or the application file or the application, i.e. Excel, is closed or continued with a new working area.

The invention claimed is:

1. A method for operating a display apparatus, including the following steps:
   a) capturing image data of at least one part of the head of a user;
   b) ascertaining at least one parameter value of at least one parameter from the image data captured in step a), wherein the at least one parameter value is alterable in response to movement of at least one part of the head of the user;
   c) controlling a visual representation for operating an application by the user on a display apparatus depending on the ascertained at least one parameter;
   d) ascertaining at least one quality parameter based on the capture in step a); and
   e) varying at least one resolution of at least one part of the visual representation depending on the at least one quality parameter;
   wherein the parameter ascertained in step b) represents a measured quantity and the quality parameter represents the accuracy of measurement associated with the measured quantity or a measure of the accuracy of measurement associated with the measured quantity.

2. The method according to claim 1,
   wherein
   for ascertaining the at least one quality parameter, a quality and/or magnitude of the parameter ascertained in step b) and/or a quality of capture of the image data and/or for determining the at least one quality parameter the image data captured in step a) is analyzed.

3. The method according to claim 1,
   wherein
   the visual representation includes at least one movable element movable by movement of at least one part of the head, wherein in step e) the resolution of a movement speed of the at least one movable element is varied depending on the at least one quality parameter.

4. The method according to claim 1,
   wherein
   in step e) the resolution of the entire visual representation is varied depending on the at least one quality parameter.

5. The method according to claim 4,
   wherein
   the visual representation includes at least one static and/or dynamic element, wherein in step e) the resolution of the static and/or dynamic element is varied depending on the at least one quality parameter.

6. The method according to claim 4,
   wherein
   in step e) the resolution of the entire visual representation is varied.

7. The method according to claim 4,
   wherein
   as a part of the visual representation, the resolution of at least one element from the following group is varied:
   an area according to a magnifier function;
   the content of a presettable working window;
   a mouse pointer;
   a cursor;
   an operating element of an application;
   a content element or an area of the data represented by an application; or
   logical segments of an application, which the visual representation generates.

8. The method according to claim 1,
   wherein
   for ascertaining the at least one quality parameter, at least one quantity from the following group is ascertained:
   parameters of the image data captured in step a), in particular noise portions, frequency, intensity distributions in the image and/or of at least one ascertained object; or
   parameters in the evaluation of the image data captured in step a), in particular in intermediate or result data calculated from the captured image data.

9. The method according to claim 1,
   wherein
   for ascertaining the at least one quality parameter, the image data captured in step a) is analyzed with regard to at least one of the following quantities:
   frequency portions in presettable frequency ranges, in particular by spatio-temporal frequency analysis or wavelets;
   contrast values in presettable image areas, in particular gradients, edges, intensities, rates/distributions in image areas;
   magnitude values of presettable parameters;
   magnitude values of result data;
   the presence of at least one presettable object; and/or
   a rate of change or acceleration of intermediate or result data ascertained from the image data captured in step a).

10. The method according to claim 1,
    wherein
    the resolution is varied according to a linear, a non-linear, a continuous and/or a discontinuous characteristic line.

11. The method according to claim 1,
wherein
the variation of the resolution can be turned on and off by a user in particular by a key command, a voice command or a gesture command.

12. The method according to claim 1,
wherein
at least one resolution once set is stored and again retrieved by a user depending on or independently of an application generating the visual representation, wherein the storage and retrieval is effected by pre-adjusted interactions or interactions presettable by the user, in particular by key commands, voice commands or gesture commands, or that a context is co-stored and the retrieval of a stored resolution is automatically effected upon occurrence of the context.

13. The method according to claim 12,
wherein
the context is determined from one or more of the following parameters:
a presettable application;
a presettable file;
a presettable view of an application, in particular of the toolbar, windows, tools;
a presettable view of a file, in particular with respect to the visible data, the processing settings, the layout, the visible structures; or
a certain process step in a flow, which is offered by an application.

14. The method according to claim 1,
wherein
the at least one quality parameter is ascertained:
after step a), in particular with step b) or between step b) and step c);
continuously, i.e. after step a) and further in presettable temporal distances and/or depending on at least one presettable event, preferably upon exceeding and/or falling below at least one presettable threshold value for image, intermediate or result data, in particular of at least one quality parameter derived from this data.

15. The method according to claim 1,
wherein
the adaptation of the resolution is effected according to at least one of the following conditions:
continuously, whenever the quality parameter obtains a new value;
if the quality parameter exceeds at least one presettable threshold value;
if the context changes; or
if the user executes a presettable action, in particular presses a presettable key, executes a presettable gesture and/or delivers a presettable acoustic signal.

16. The method according to claim 1,
wherein
as the at least one part of the head of the user, his head and/or one and/or two eyes of the user is/are moved.

17. The method according to claim 1,
wherein
the quality parameter relates to a quality of the image data or a quality of intermediate or result data calculated from the image data.

18. The method according to claim 1,
wherein
the quality parameter relates to a quality of the parameter ascertained from the image data or of the image data.

19. A non transitory computer program product with a program for a computer device, with program code sections for executing and/or causing the steps according to claim 1 when the program is executed on the computer device.

20. A system for operating a display apparatus including:
a capturing device for capturing image data of at least one part of the head of a user;
at least one computing device, which is adapted to ascertain at least one parameter value of at least one parameter from the image data captured by the capturing device, wherein the at least one parameter value is alterable in response to movement of at least one part of the head of the user;
a control device for controlling a visual representation on a display apparatus depending on the at least one parameter ascertained by the computing device for operating an application by the user;
wherein
at least one computing device is provided, which is configured to ascertain at least one quality parameter based on the image data captured by the capturing device, wherein the control device is further adapted to vary at least one resolution of at least one part of the visual representation depending on the at least one quality parameter, wherein the parameter ascertained by the at least one computing device represents a measured quantity and the quality parameter represents the accuracy of measurement associated with the measured quantity or a measure of the accuracy of measurement associated with the measured quantity.

21. The system according to claim 20,
wherein
the quality parameter relates to a quality of the image data or a quality of intermediate or result data calculated from the image data.

22. The system according to claim 20,
wherein
the quality parameter relates to a quality of the parameter ascertained from the image data or of the image data.

* * * * *